(12) United States Patent
Chou

(10) Patent No.: US 10,857,697 B2
(45) Date of Patent: Dec. 8, 2020

(54) EXTRUSION EQUIPMENT ADAPTED FOR SUPERCRITICAL FOAMING AND MIXING

(71) Applicant: Yen-Ju Chou, Tainan (TW)

(72) Inventor: Yen-Ju Chou, Tainan (TW)

( * ) Notice: Subject to any disclaimer, the term of this patent is extended or adjusted under 35 U.S.C. 154(b) by 261 days.

(21) Appl. No.: 16/110,279

(22) Filed: Aug. 23, 2018

(65) Prior Publication Data

US 2019/0061199 A1 Feb. 28, 2019

(30) Foreign Application Priority Data

Aug. 24, 2017 (TW) .............................. 106212541 A

(51) Int. Cl.
| | |
|---|---|
| B29B 7/00 | (2006.01) |
| B29B 7/48 | (2006.01) |
| B01F 3/04 | (2006.01) |
| B01F 7/00 | (2006.01) |
| B01F 13/06 | (2006.01) |
| B01F 13/10 | (2006.01) |
| B29B 7/42 | (2006.01) |
| B29B 7/60 | (2006.01) |
| B29B 7/74 | (2006.01) |
| B29K 105/04 | (2006.01) |
| B01F 3/00 | (2006.01) |
| B29B 7/82 | (2006.01) |
| B29B 9/06 | (2006.01) |

(52) U.S. Cl.
CPC .......... *B29B 7/484* (2013.01); *B01F 3/04453* (2013.01); *B01F 7/00891* (2013.01); *B01F 13/065* (2013.01); *B01F 13/1016* (2013.01); *B29B 7/429* (2013.01); *B29B 7/489* (2013.01); *B29B 7/60* (2013.01); *B29B 7/7461* (2013.01); *B01F 2003/0064* (2013.01); *B01F 2003/04964* (2013.01); *B01F 2215/0049* (2013.01); *B01F 2215/0431* (2013.01); *B29B 7/7495* (2013.01); *B29B 7/823* (2013.01); *B29B 7/826* (2013.01); *B29B 9/06* (2013.01); *B29K 2105/04* (2013.01)

(58) Field of Classification Search
CPC .... B28B 7/484; B01F 7/00891; B01F 13/065; B01F 13/1016; B01F 2003/0064; B01F 2003/04964; B01F 2215/0049; B01F 2215/0431; B29B 7/429; B29B 7/489; B29B 7/60; B29B 7/7461; B29B 7/7495; B29B 7/823; B29B 7/826; B29B 9/06
See application file for complete search history.

(56) References Cited

U.S. PATENT DOCUMENTS

| | | | | |
|---|---|---|---|---|
| 6,299,340 B1 * | 10/2001 | Lu | ......................... | B30B 11/245 366/76.3 |
| 2011/0091596 A1 * | 4/2011 | Saiuchi | ................... | B29B 7/728 425/376.1 |
| 2017/0037216 A1 * | 2/2017 | Lv | ............................. | B29B 7/60 |

\* cited by examiner

*Primary Examiner* — Anshu Bhatia
(74) *Attorney, Agent, or Firm* — Muncy, Geissler, Olds & Lowe, P.C.

(57) ABSTRACT

An extrusion equipment adapted for supercritical foaming and mixing of a raw material includes a mixing unit, an injection unit for injection of supercritical fluid into the mixing unit, and an extrusion unit for extrusion of the raw material. The mixing unit includes a tube for input of the raw material, and a propelling screw rod and an auxiliary screw rod that are disposed side by side in the tube and that cooperatively compress and propel the raw material. The auxiliary screw rod rotates at a speed at least twice that of the propelling screw rod and in a direction opposite to that of the propelling screw rod.

9 Claims, 5 Drawing Sheets

EXTRUSION EQUIPMENT ADAPTED FOR SUPERCRITICAL FOAMING AND MIXING

CROSS-REFERENCE TO RELATED APPLICATION

This application claims priority of Taiwanese Invention Patent Application No. 106212541, filed on Aug. 24, 2017.

FIELD

The disclosure relates to an extrusion equipment, and more particularly to an extrusion equipment adapted for supercritical foaming and mixing.

BACKGROUND

In plastic extrusion molding processes, it is important to compound, refine and modify a mixture of various types of materials. Continuous extrusion is a way of modifying plastic to form a foam. Referring to FIG. 1, a conventional method of continuous extrusion is conducted by an extrusion equipment 9. The extrusion equipment 9 includes a mixing tube 91 formed with a feed inlet 911, a screw rod 92 disposed rotatably in the mixing tube 91, an injection tube 93, and an extrusion die 94. During the continuous extrusion molding process, a raw material that is in a molten state is injected into the mixing tube 91 from the feed inlet 911, and the screw rod 92 is rotated to propel the raw material. At the same time, supercritical fluid such as carbon dioxide, nitrogen, etc., is injected into the mixing tube 91 from the injection tube 93, so that the supercritical fluid can be used as a foaming agent in the continuous extrusion molding process. Due to high diffusivity and solubility of polymer plastic materials, the supercritical fluid helps in forming a single-phase solution that contains polymer and foaming gas for subsequent extrusion of foaming material through the extrusion die 94.

However, in practice, the raw material usually has a certain level of moisture content, such that some of the water component in the raw material may be evaporated due to the high temperature during the extrusion process. The water vapor may flow along the mixing tube 91 and tend to vent through the feed inlet 911, forming a resistance toward the outward direction at the feed inlet 911, resulting in the feeding process of the raw material through the feed inlet 911 to be not smooth. As such, the conventional extrusion equipment 9 may be unsuitable for extrusion of raw material with high moisture content, and hence is usually used for raw material having a moisture content of less than 20%.

SUMMARY

Therefore, an object of the disclosure is to provide an extrusion equipment that can alleviate at least one of the drawbacks of the prior art.

According to the disclosure, the extrusion equipment adapted for supercritical foaming and mixing of a raw material that is in a molten state includes a mixing unit, an injection unit and an extrusion unit. The mixing unit includes a tube adapted for inputting the raw material, a propelling screw rod for propelling the raw material, and an auxiliary screw rod cooperating with the propelling screw rod to compress and propel the raw material. The propelling screw rod is mounted rotatably in the tube. The auxiliary screw rod is mounted rotatably in the tube, and is disposed side by side with the propelling screw rod. The auxiliary screw rod has a rotation speed at least twice that of the propelling screw rod, and has a rotating direction opposite to that of the propelling screw rod. The injection unit is connected to the mixing unit for injecting supercritical fluid into the tube. The extrusion unit is disposed downstream of the mixing unit, and is used for extrusion of a mixture of the raw material and the supercritical fluid.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
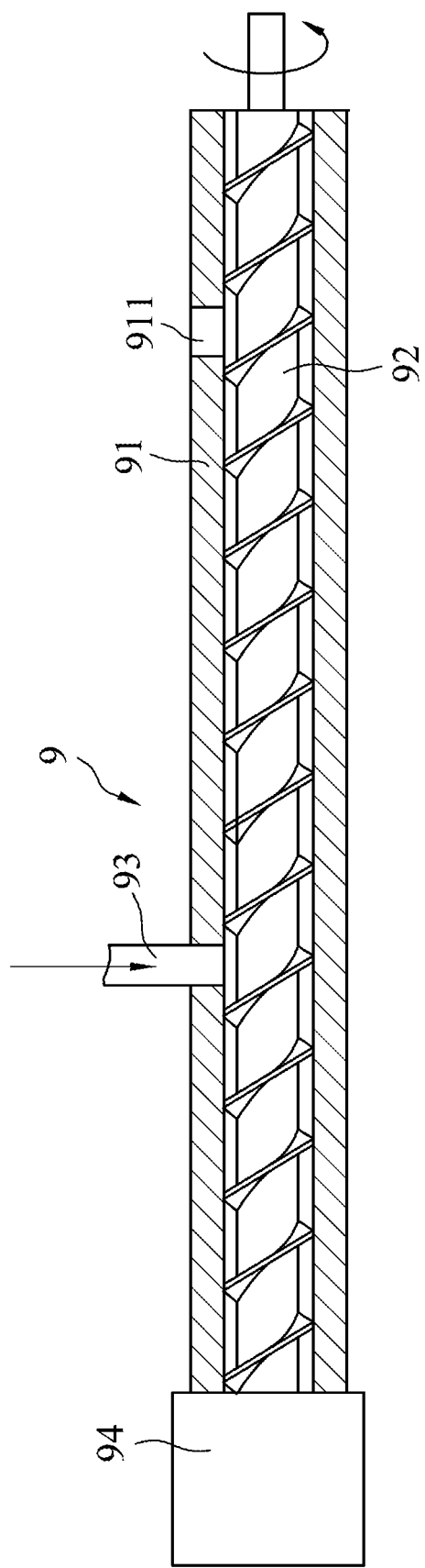
FIG. 1 is a schematic diagram illustrating a conventional extrusion equipment.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
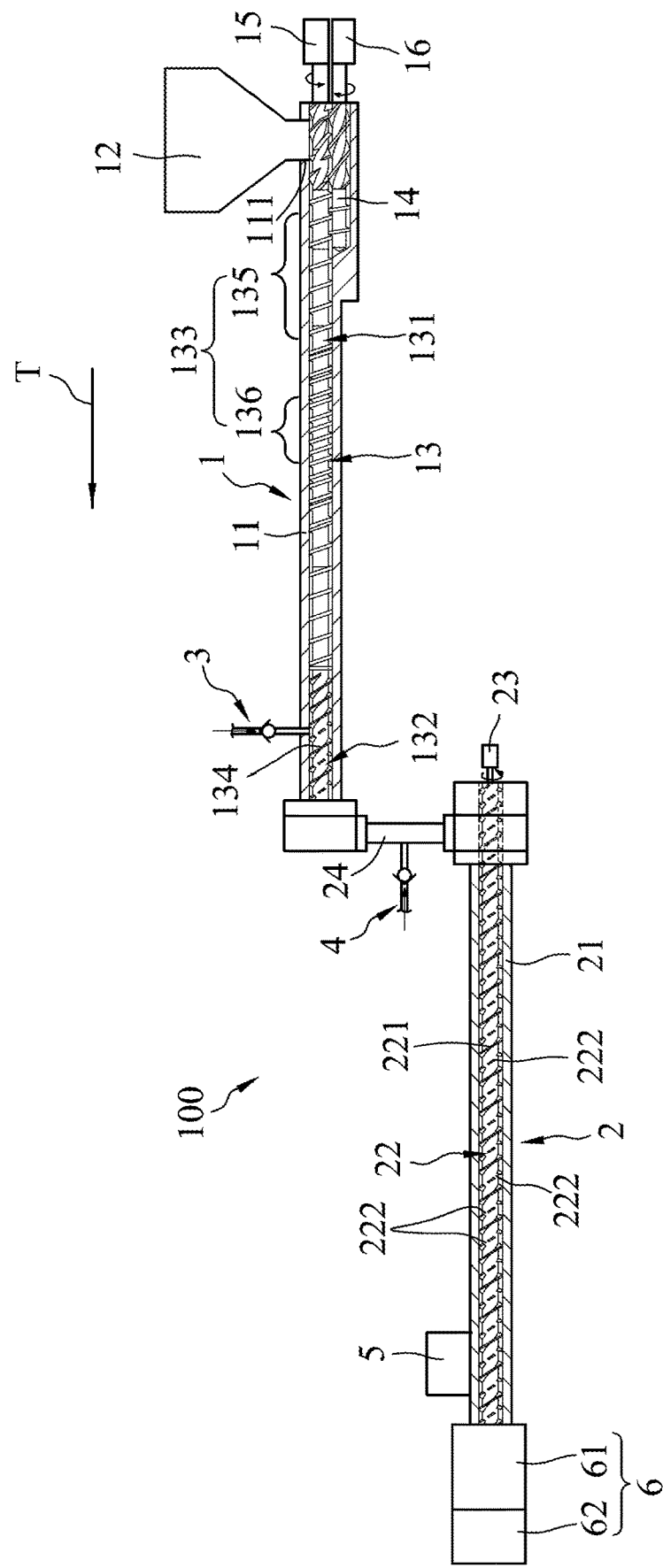
FIG. 2 is a schematic diagram illustrating a first embodiment of an extrusion equipment adapted for supercritical foaming and mixing according to this disclosure.
Figure 3:
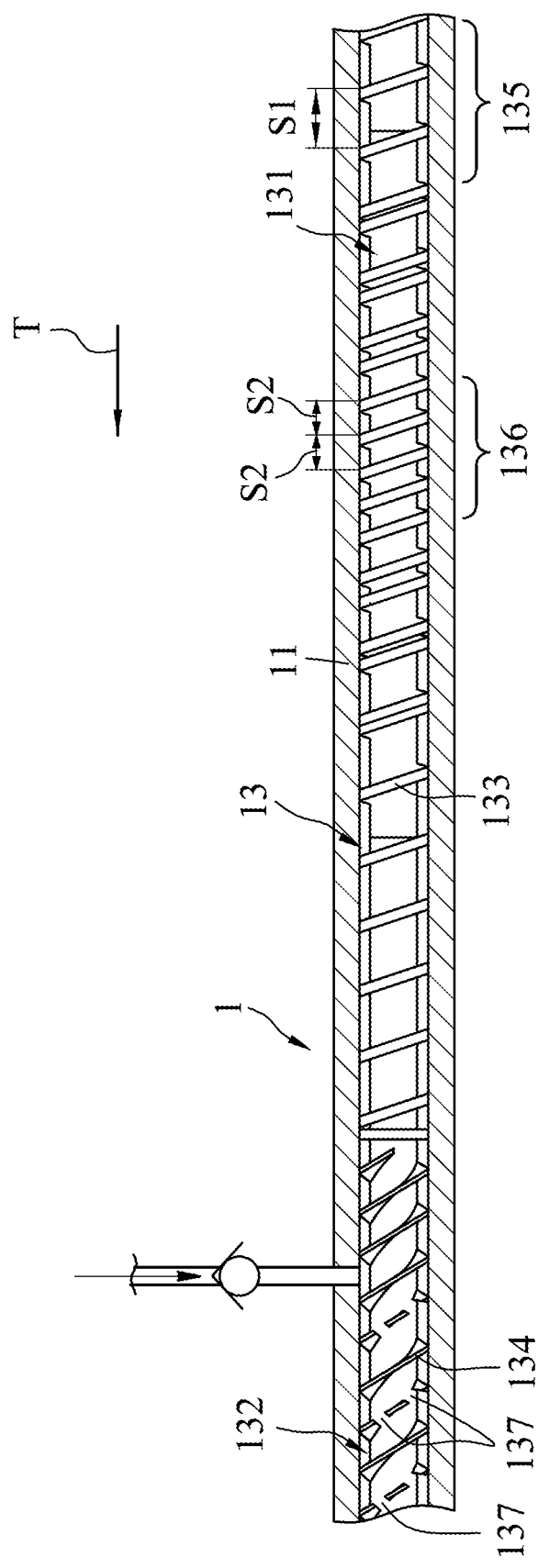
FIG. 3 is an enlarged fragmentary view of the first embodiment.

Referring to FIGS. 2 and 3, the first embodiment of an extrusion equipment according to the present disclosure is adapted for supercritical foaming and mixing of a raw material that is in a molten state. The raw material may be, for example, a plastic material, a biodegradable material (e.g., polylactic acid), or a mixture of at least two materials. By use of the extrusion equipment of this embodiment, the raw material may be formed into a foam, a rubber-plastic co-extrudate, etc. The extrusion equipment includes a mixing apparatus 100, a cooling unit 5 and an extrusion unit 6. In this embodiment, the mixing apparatus 100 includes a first mixing unit 1, a second mixing unit 2, a first injection unit 3 and a second injection unit 4.

The first mixing unit 1 includes a first tube 11 adapted for inputting the raw material, a hopper 12 connected to the first tube 11 and adapted for feeding the raw material into the first tube 11, a first screw rod 13 mounted rotatably in the first tube 11 and used for propelling the raw material, an auxiliary screw rod 14 mounted rotatably in the first tube 11 and disposed side by side with the first screw rod 13, a first power source 15 for driving the first screw rod 13 to rotate, and an auxiliary power source 16 for driving the auxiliary screw rod 14 to rotate.

The first tube 11 extends along a transferring direction (T), and is formed with a feed inlet 111 in spatial communication with the hopper 12 for feeding the raw material into the first tube 11. The first screw rod 13 extends along the transferring direction (T), and includes a first rod section 131 disposed at a side of and adjacent to the auxiliary screw rod 14, and a second rod section 132 connected to the first rod section 131 and disposed distally from the auxiliary screw rod 14 in comparison to the first rod section 131. The first rod section 131 is formed with a continuous screw thread 133, which means that the screw thread 133 winds spirally and continuously without being segmented. The screw thread 133 has a first thread section 135 adjacent to the auxiliary screw rod 14 and having a first screw pitch (S1), and a second thread section 136 connected to the first thread section 135 and having a second screw pitch (S2) that is smaller than the first screw pitch (S1). The second rod section 132 is formed with a non-continuous screw thread 134 that is formed with a plurality of notches 137 disposed in a manner of being spaced apart among one another along an extending path of the screw thread 134. In such a manner, the thread of the screw thread 134 has broken sections and is non-continuous by virtue of the notches 137.

In this embodiment, the auxiliary screw rod 14 generally corresponds in position to the feed inlet 111, and has a continuous thread. The auxiliary screw rod 14 extends along the transferring direction (T), and cooperates with the first screw rod 13 to extrude and propel the raw material. The auxiliary screw rod 14 is not longer than the first screw rod 13, and is driven by the auxiliary power source 16 to rotate at a rotation speed that is at least twice a rotation speed of the first screw rod 13 in a rotating direction that is opposite to that of the first screw rod 13. In this embodiment, the first screw rod 13 and the auxiliary screw rod 14 are driven by the first power source 15 and the auxiliary power source 16, respectively, and not by a same, single power source. Each of the first power source 15 and the auxiliary power source 16 may be, for example, a motor.

The second mixing unit 2 is disposed between the first mixing unit 1 and the extrusion unit 6, and includes a second tube 21, and a second screw rod 22 mounted rotatably in the second tube 21 and used for propelling the raw material coming from the first mixing unit 1, a second power source 23 for driving the second screw rod 22 to rotate, and a connecting tube 24 connecting the first tube 11 and the second tube 21. The second tube 21 extends along the transferring direction (T). The second screw rod 22 also extends along the transferring direction (T). The second screw rod 22 is formed with a non-continuous screw thread 221 that is formed with a plurality of notches 222 disposed in a manner of being spaced apart among one another along an extending path of the screw thread 221. The connecting tube 24 of this embodiment extends along a direction that is transverse to the transferring direction (T), and hence is disposed non-parallel to the first tube 11 and the second tube 21. Through the connecting tube 24, the first tube 11 and the second tube 21 are connected to each other in a manner of forming a bending structure thereamong.

The first injection unit 3 is connected to the first mixing unit 1, and is used for injecting supercritical fluid into the first tube 11. The first injection unit 3 includes components such as a pipe, a valve (not shown), etc. The aforementioned supercritical fluid may be supercritical carbon dioxide, supercritical nitrogen, etc.

The second injection unit 4 is connected to the connecting tube 24 for injection of supercritical fluid into the connection tube 24 and the second tube 21. The second injection unit 4 includes components such as a pipe, a valve (not shown), etc. The aforementioned supercritical fluid may be supercritical carbon dioxide, supercritical nitrogen, etc.

The cooling unit 5 is disposed proximate to an end portion of the mixing apparatus 100 and upstream of the extrusion unit 6, and is used for cooling a mixture of the raw material and the supercritical fluid. Specifically, the cooling unit 5 of this embodiment is disposed proximate to an end section of the second mixing unit 2, and is controlled by a temperature controlling system (not shown) as required for cooling.

The extrusion unit 6 is disposed downstream of the first mixing unit 1 and the second mixing unit 2, and is adapted for extrusion of the mixture of the raw material and the supercritical fluid. The extrusion unit 6 includes a gear set 61 disposed downstream of the second tube 21, and an extrusion die 62 disposed downstream of the gear set 61. The gear set 61 includes a plurality of intermeshing gears (not shown in the figures). A pumping effect is generated by rotation of the gears for propelling the transfer of the mixture from the second mixing unit 2 to the extrusion die 62, and then the extrusion die 62 is used to extrude a predetermined product, such as rubber pellets, pipes, rods, products with irregular/particular profiles, etc.

In use, the raw material in a molten state is injected into the first tube 11 from the hopper 12, and the supercritical fluid is injected into the first tube 11 from the first injection unit 3. The first screw rod 13 and the auxiliary screw rod 14 are in cooperation with each other to mix and press the raw material, to accelerate propulsion of the raw material and to mix the raw material with the supercritical fluid. By virtue of the configuration that the rotation speed of the auxiliary screw rod 14 is at least twice the rotation speed of the first screw rod 13, a good auxiliary effect of mixing, compressing and propelling may be achieved. Moreover, a powerful propelling force in the transferring direction (T) is formed by cooperation between the rotation of the auxiliary screw rod 14 and the rotation of the first screw rod 13, thereby providing a good barrier function to prevent water vapor generated by high temperature in the first tube 11 from flowing toward the feed inlet 111. Since the pitch (S2) of the second thread section 136 is smaller than the pitch (S1) of the first thread section 135 (i.e., arrangement of screw crests of the second thread section 136 is more compact than that of the first thread section 135), a larger compressing force is provided when the raw material is propelled to the second thread section 136, so that the raw material is more thoroughly mixed and compressed therein, in order to facilitate the formation of a homogenous mixture of the raw material and the supercritical fluid. However, it is noted that this disclosure is not limited in this respect, and the pitches of all portions of the first screw thread 133 may be identical in some embodiments.

Furthermore, the notches 137 of the non-continuous screw thread 134 of the second rod section 132 may yield a shearing effect on the raw material or mixture, and cause a part of the raw material or mixture originally propelled forward to flow backwards through the notches 137, so that the forwardly propelled raw material or mixture and the backflow of the raw material or mixture may be pressed against each other at the second rod section 132, and may hence be mixed more thoroughly with the supercritical fluid. Moreover, since the injection portion of the first injection unit 3 is disposed in correspondence to the second rod section 132, the mixing effect of the supercritical fluid and the raw material is rather good. It is noted that the backflow of the raw material or mixture mostly occurs at the second rod section 132, and the amount of the backflow is smaller than the amount of the forwardly propelled raw material or mixture, so, as a whole, the raw material or mixture would still be smoothly transferred forward. In addition, the shearing and mixing effect at the second rod section 132 does not affect the propelling of the raw material or mixture by the first rod section 131. However, in other embodiments, it is not necessary for the second screw thread 134 to be of the non-continuous type. That is, the whole thread of the first screw rod 13 may all be of the continuous type.

Going downstream from the first mixing unit 1, the mixture is inputted into the second mixing unit 2 from the first mixing unit 1. Since the connecting tube 24 connects the first tube 11 and the second tube 21 in a bending manner, further pressing of the mixture may occur to make the mixture more homogeneous. Furthermore, injection of the supercritical fluid at the connecting tube 24 through the second injection unit 4 may ensure sufficient provision of the supercritical fluid for further thorough mixture of the raw material and the supercritical fluid. Then, the mixture is propelled by rotation of the second screw rod 22. The mixture may be subjected to the same effect when flowing in the notches 222 of the non-continuous screw thread 221 of the second screw rod 22, as those described in connection with the notches 137 of the screw thread 134 of the first screw rod 11. As such, when the mixture is disposed in the second tube 21, in the same token, through the shearing effect and the backflow of the mixture generated by the notches 222, the mixture disposed at the second screw rod 22 can be sheared, thoroughly mixed and thoroughly compressed with the supercritical fluid to achieve a fully homogeneous effect. Finally, the mixture of thoroughly mixed raw material and supercritical fluid is cooled by the cooling unit 5 to a temperature suitable for conducting subsequent steps, and passes the extrusion unit 6 to be extruded to a predetermined product by the extrusion die 62 so as to complete the extrusion process.

In this embodiment, the processing temperatures of the first mixing unit 1 and the second mixing unit 2 range between 60° C. and 300° C., and the pressure is greater than 10 Bar. Moreover, the first screw rod 13 has a length-diameter ratio of between 6:1 and 58:1, and the auxiliary screw rod 14 has a length-diameter ratio of between 6:1 and 32:1. Such length-diameter ratios may lead to good feeding and propelling of the raw material. In practice, the length-diameter ratios can be adjusted according to factors such as the amount of extrudate, the size of the cross section of the products, etc. In this embodiment, the flow rate of the raw material in the first tube 11 and the second tube 21 is greater than 5 gram/second, and the flow rate of the supercritical fluid is greater than 0.5 gram/second, and by having an appropriate control of the flow rates of the raw material and the supercritical fluid, the amount of the raw material and the supercritical fluid provided per unit time will be appropriate. As a result of ensuring appropriateness of both the injection speed and the propelling speed a thorough mixing effect can be achieved.

In sum, in the first embodiment, by the foregoing design of the components, the continuous extrusion process adapted for supercritical foaming and mixing can be well conducted. Moreover, by virtue of the rotation speed of the auxiliary screw rod 14 to be at least twice that of the first screw rod 13, an excellent stirring, pressing and propelling, and a more thorough and homogeneous mixing of the supercritical fluid and the raw material can be achieved, so as to yield a product with good quality. In addition, the auxiliary screw rod 14 provides a strong propelling force, such that once entered the first mixing unit 1, the raw material is propelled with enough strength at the feed inlet 111 to prevent the water vapor generated by the raw material or in the tubes from flowing toward the feed inlet 111, enabling a smooth feeding process. With these improvements, this embodiment can be adapted for extrusion of raw material with relatively high moisture content, having an extent as high as 70%. As such, a great variety of raw materials can be extruded by this embodiment, and thus the scope of application and use of this embodiment is much wider in comparison with the prior art.

Figure 4:
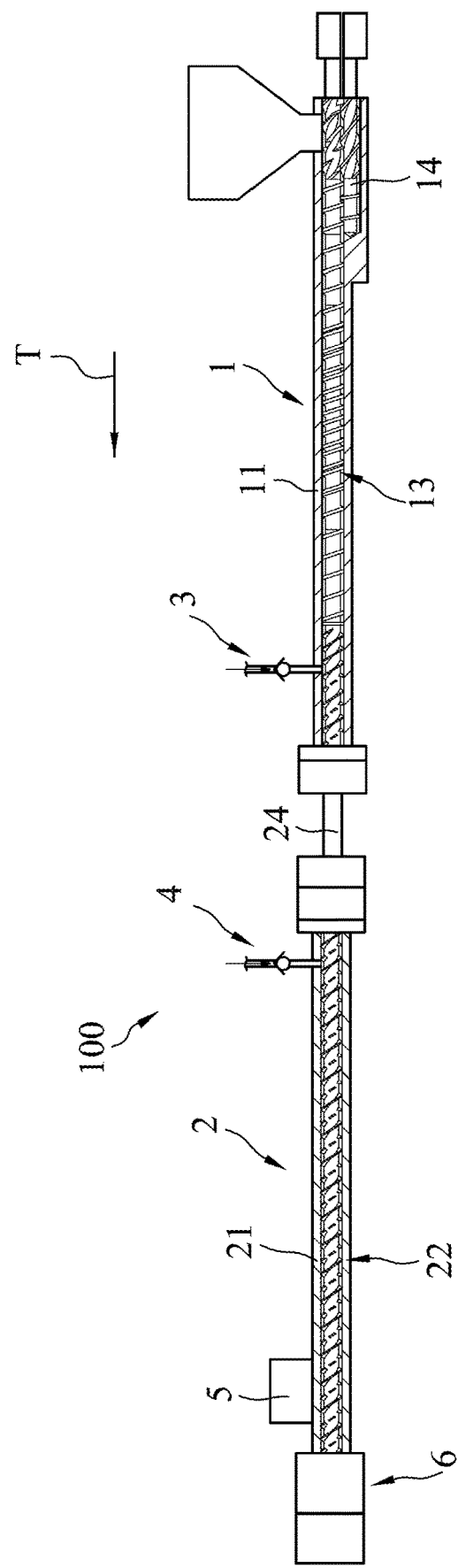
FIG. 4 is a schematic diagram illustrating a second embodiment of an extrusion equipment adapted for supercritical foaming and mixing according to this disclosure.

Referring to FIG. 4, the second embodiment of the extrusion equipment adapted for supercritical foaming and mixing according to this disclosure is similar to the first embodiment, and differs from the first embodiment in that: the lengthwise direction of the connecting tube 24 of the second embodiment is parallel to the transferring direction (T), so that the first tube 11, the connecting tube 24 and the second tube 21 cooperatively form a substantially straight mixing apparatus 100 (without considering the hopper 12); and the second injection unit 4 of the second embodiment is connected to the second tube 21, so that the supercritical fluid is directly injected into the second tube 21.

Figure 5:
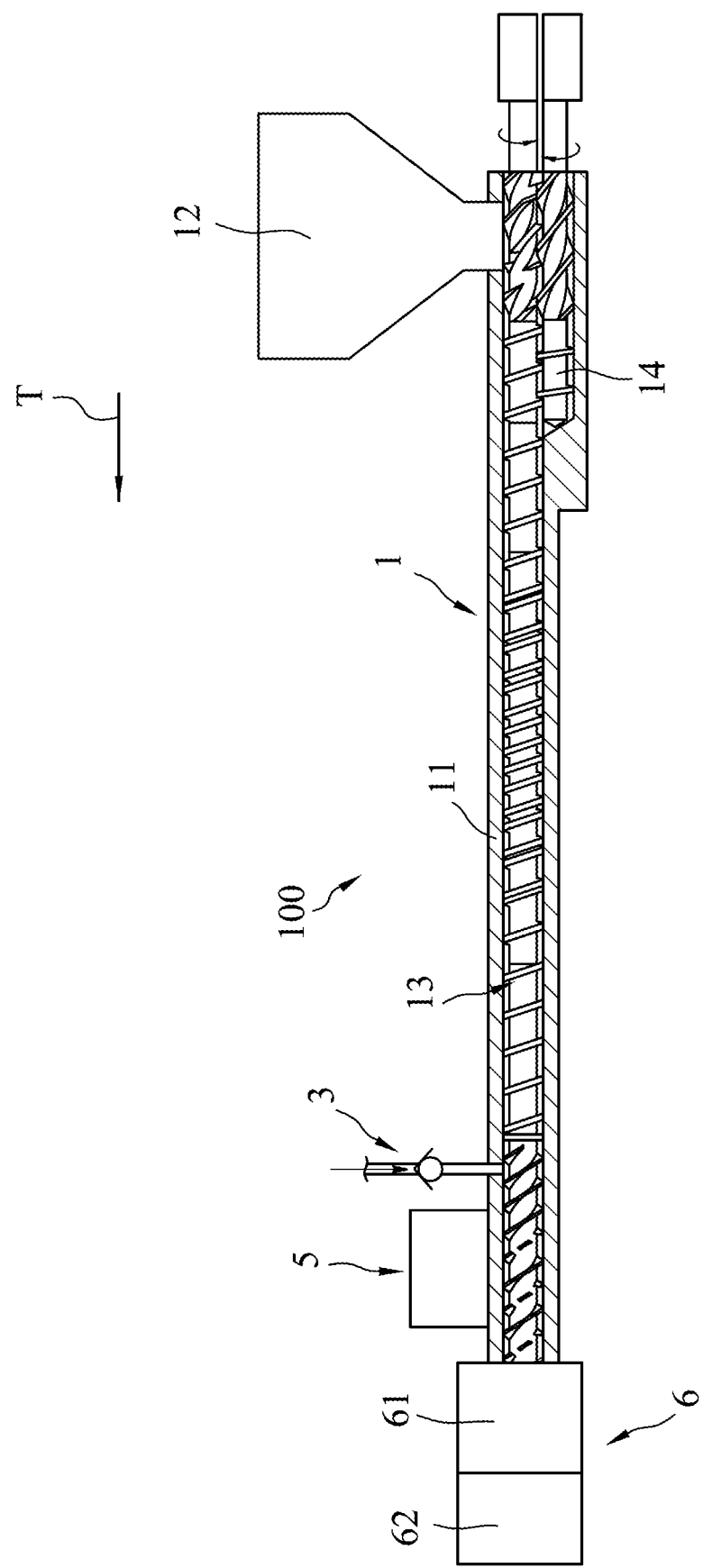
FIG. 5 is a schematic diagram illustrating a third embodiment of an extrusion equipment adapted for supercritical foaming and mixing according to this disclosure.

Referring to FIG. 5, the third embodiment of the extrusion equipment adapted for supercritical foaming and mixing according to this disclosure is similar to the first embodiment, and differs from the first embodiment in that the third embodiment only includes the first mixing unit 1, the first injection unit 3 the cooling unit 5 and the extrusion unit 6. Since a good mixing effect may be achieved by using the first mixing unit 1 that includes the first screw rod 13 and the auxiliary screw rod 14, the second mixing unit 2 (see FIG. 1) and the second injection unit 4 (see FIG. 1) of the first embodiment may be omitted. In this embodiment, the extrusion unit 6 is connected to the first mixing unit 1, and the cooling unit 5 is disposed at an end section of the first mixing unit 1. When the raw material and the supercritical fluid are completely mixed, the raw material is cooled by the cooling unit 5, and then is extruded by the extrusion unit 6.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:
1. An extrusion equipment adapted for supercritical foaming and mixing of a raw material that is in a molten state, comprising:
   a first mixing unit including:
   a first tube that is adapted for receiving input of the raw material;
   a first screw rod that is mounted rotatably in said first tube and that is used for propelling the raw material; and an auxiliary screw rod that is mounted rotatably in said first tube, that is disposed side by side with said first screw rod, and that cooperates with said first screw rod to compress and propel the raw material,
wherein said auxiliary screw rod has a rotation speed at least twice that of said first screw rod, and has a rotating direction opposite to that of said first screw rod;
a first injection unit connected to said first mixing unit, and used for injecting a supercritical fluid into said first tube; and
an extrusion unit disposed downstream of said first mixing unit, and used for extrusion of a mixture of the raw material and the supercritical fluid;
wherein said first tube is formed with a feed inlet for feeding the raw material into said first tube, and said auxiliary screw rod is not longer than said first screw rod and corresponds in position to said feed inlet; and
wherein said first injection unit is disposed downstream of said feed inlet of said first tube and between said extrusion unit and said feed inlet, and is spaced apart from said feed inlet.

2. The extrusion equipment as claimed in claim 1, wherein said first screw rod has a first rod section disposed at a side of said auxiliary screw rod, and a second rod section connected to said first rod section, said first rod section being formed with a continuous screw thread, said second rod section being formed with a non-continuous screw thread that is formed with a plurality of notches disposed in a manner of being spaced apart among one another along an extending path of said non-continuous screw thread.

3. The extrusion equipment as claimed in claim 1, further comprising a second mixing unit disposed between said first mixing unit and said extrusion unit, said second mixing unit including a second tube, and a second screw rod mounted rotatably in said second tube and used for propelling the raw material.

4. The extrusion equipment as claimed in claim 3, wherein said second mixing unit further includes a connecting tube connecting said first tube and said second tube, said connecting tube being disposed non-parallel to said first tube and said second tube, said extrusion equipment further comprising a second injection unit connected to said connecting tube for injecting the supercritical fluid into said connecting tube.

5. The extrusion equipment as claimed in claim 3, further comprising a second injection unit connected to said second tube for injecting supercritical fluid into said second tube.

6. The extrusion equipment as claimed in claim 3, wherein said second screw rod is formed with a non-continuous screw thread that is formed with a plurality of notches disposed in a manner of being spaced apart among one another along an extending path of said non-continuous screw thread.

7. The extrusion equipment as claimed in claim 1, wherein said first screw rod has a first thread section having a first screw pitch, and a second thread section having a second screw pitch that is smaller than the first screw pitch.

8. The extrusion equipment as claimed in claim 1, wherein said first screw rod has a length-diameter ratio ranging between 6:1 and 58:1, and said auxiliary screw rod has a length-diameter ratio ranging between 6:1 and 32:1.

9. The extrusion equipment as claimed in claim 1, wherein said first screw rod has a first thread section adjacent to said auxiliary screw rod and having a first screw pitch, and a second thread section connected to said first thread section and having a second screw pitch that is smaller than the first screw pitch.

* * * * *